(12) United States Patent
Deprun

(10) Patent No.: US 8,301,695 B2
(45) Date of Patent: Oct. 30, 2012

(54) TERMINAL, SERVER AND METHOD FOR DETERMINING AND PROCESSING CONTENTS AS SPAMS

(75) Inventor: Jean-Francois Deprun, Paris (FR)

(73) Assignee: LG Electronics Inc., Seoul (KR)

( * ) Notice: Subject to any disclaimer, the term of this patent is extended or adjusted under 35 U.S.C. 154(b) by 144 days.

(21) Appl. No.: 12/864,643

(22) PCT Filed: Jan. 15, 2009

(86) PCT No.: PCT/KR2009/000210
§ 371 (c)(1),
(2), (4) Date: Jul. 26, 2010

(87) PCT Pub. No.: WO2009/102117
PCT Pub. Date: Aug. 20, 2009

(65) Prior Publication Data
US 2010/0312816 A1    Dec. 9, 2010

Related U.S. Application Data

(60) Provisional application No. 61/028,818, filed on Feb. 14, 2008.

(51) Int. Cl.
*G06F 15/16* (2006.01)

(52) U.S. Cl. ........................................ 709/203; 709/202

(58) Field of Classification Search .................. 709/202, 709/203
See application file for complete search history.

(56) References Cited

U.S. PATENT DOCUMENTS

| | | | |
|---|---|---|---|
| 2004/0177110 A1* | 9/2004 | Rounthwaite et al. | ........ 709/202 |
| 2005/0198518 A1 | 9/2005 | Kogan et al. | |
| 2007/0233861 A1 | 10/2007 | Cai et al. | |

FOREIGN PATENT DOCUMENTS

KR    10-2006-0081162 A    7/2006

* cited by examiner

*Primary Examiner* — Adnan Mirza
(74) *Attorney, Agent, or Firm* — Birch, Stewart, Kolasch & Birch, LLP

(57) ABSTRACT

A terminal, server and method for determining and processing contents as spams are discussed. According to an embodiment, the includes a method for controlling a content by using a terminal, comprising receiving a first content and a first content ID associated with the first content; transmitting the first content ID and spam information related to the first content ID to a content managing server, the spam information includes information indicating that the first content is to be considered as a spam; receiving the first content ID and indication information indicating that the first content is a spam from the content managing server; receiving a second content and a second content ID associated with the second content; comparing the second content ID, with the first content ID and the indication information; and processing the second content based on the comparison result.

12 Claims, 5 Drawing Sheets

[Fig. 1]
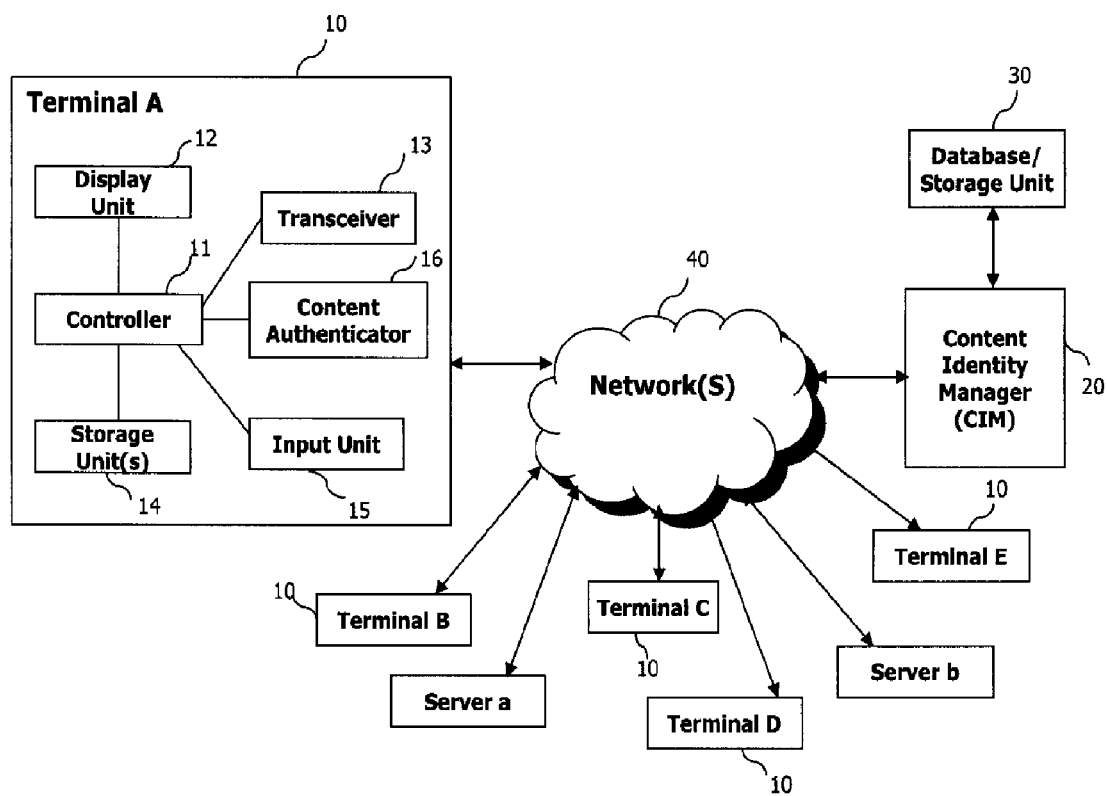

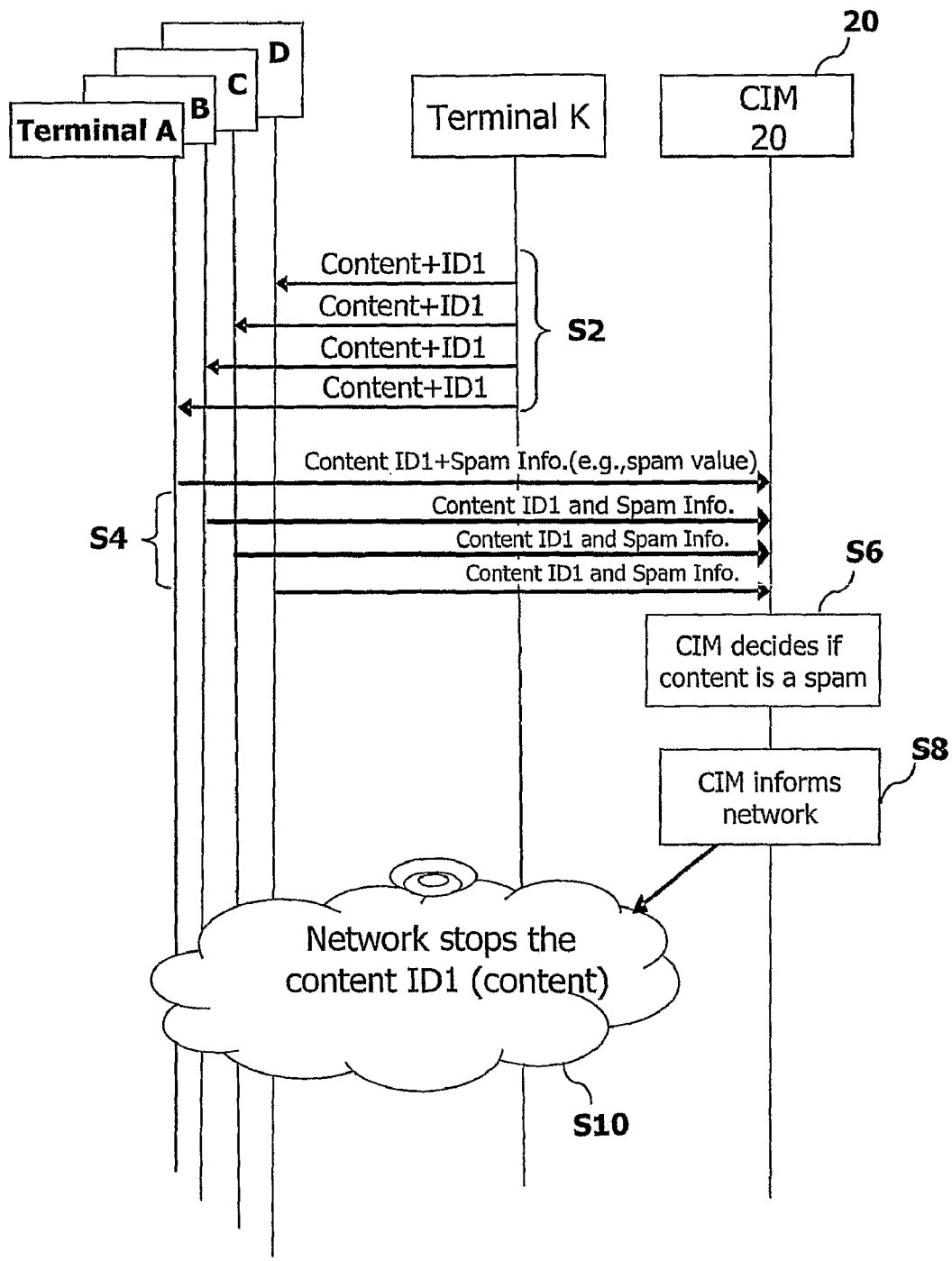

[Fig. 3]
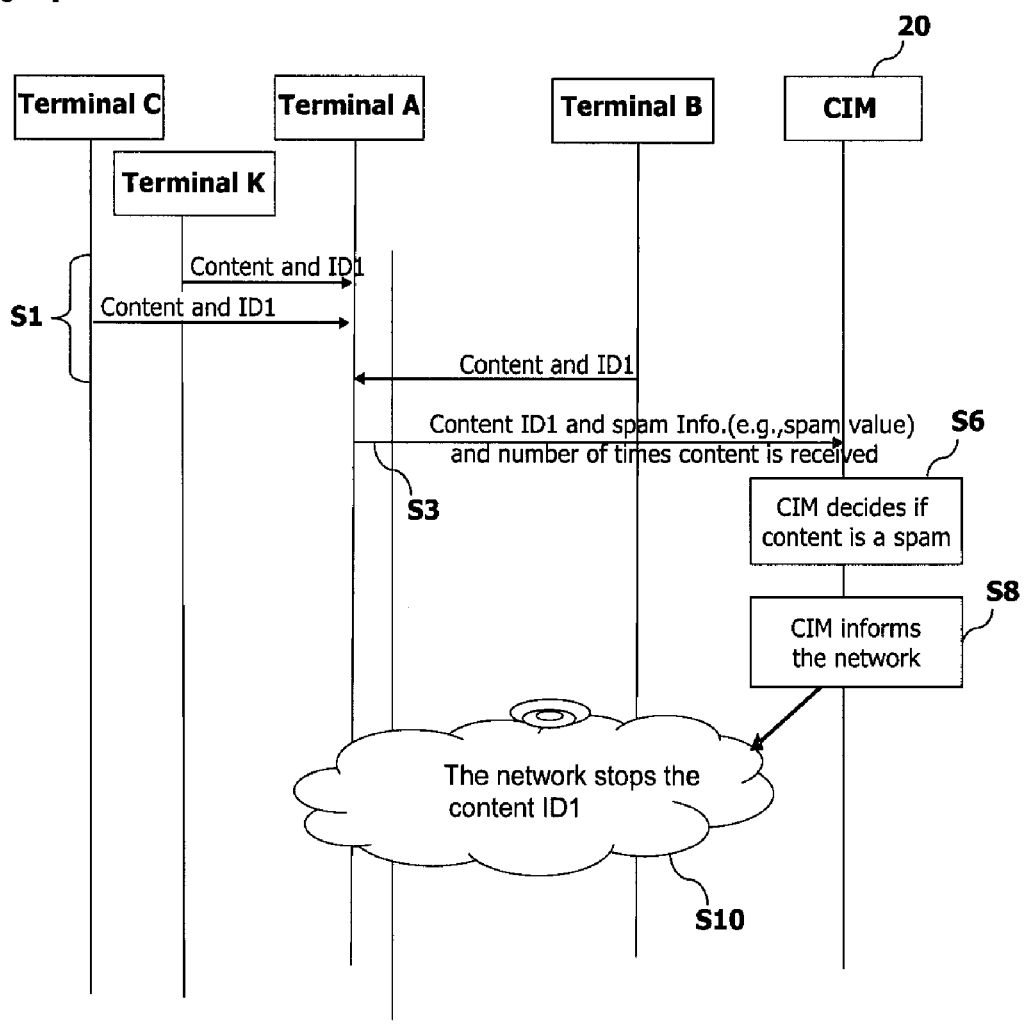

[Fig. 4]
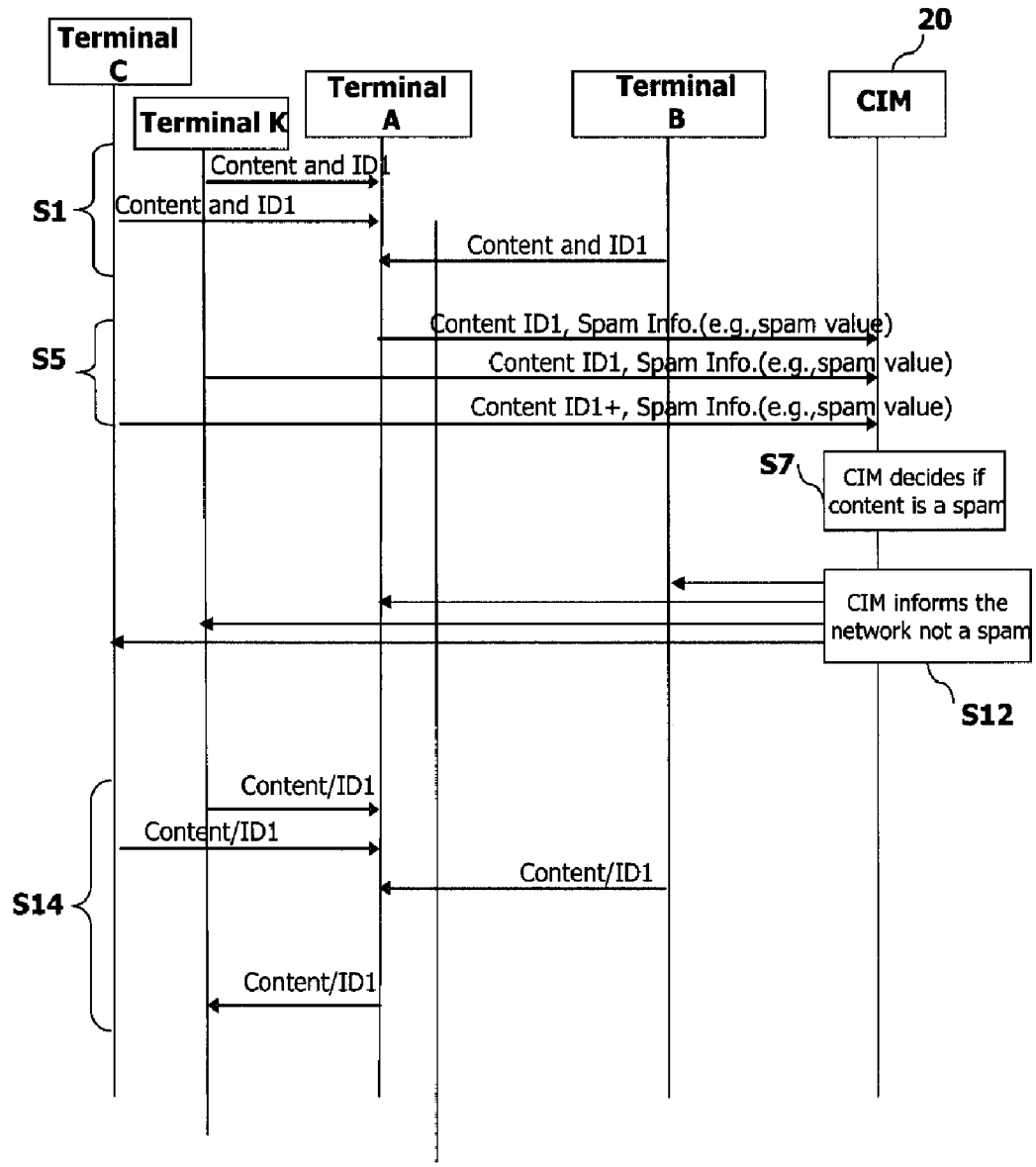

[Fig. 5]
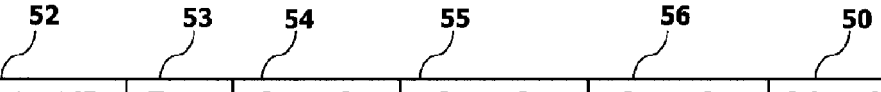

TERMINAL, SERVER AND METHOD FOR DETERMINING AND PROCESSING CONTENTS AS SPAMS

This application is the National Phase of PCT/KR2009/000210 filed on Jan. 15, 2009, which claims priority under 35 U.S.C. 119(e) to U.S. Provisional Application No. 61/028,818 filed on Feb. 14, 2008. The entire contents of these applications are hereby incorporated by reference into the present application.

The present application claims the priority benefit of U.S. Provisional Application No. 61/028,818 filed on Feb. 14, 2008. The entire contents of this application is herein fully incorporated by reference.

TECHNICAL FIELD

The present invention relates to a terminal, server and method for determining contents within a network as spams based on content identification information.

BACKGROUND ART

Technologies associated with mobile terminals are being rapidly developed and standardized, and such technologies are increasing transmissions and receptions of various contents among mobile terminals and network entities.

According to recent standardization documents of Open Mobile Alliance (OMA), a content identity manager (CIM) can be provided to identify various contents associated with services.

Generally, a CIM, which is a network entity, generates content IDs for contents associated with terminals or services. The CIM can provide a content ID assigned to a specific content to a terminal, at the request of the terminal or according to the network settings (e.g., when a new content is received by the CIM).

As more users use their terminals and mobile services, more contents are being exchanged in a network. However, some of these contents are spams which should not be exchanged in the network. As a result, it is important and desirable to correctly identify spams, among various contents, and to process the spams appropriately.

According to a related art, each terminal user can decide if a content is a spam based on the sender of the content or by the content itself. Once the terminal user indicates to the CIM that the contents from such a sender are spams, the CIM blocks the contents in the network so that the indicated spam contents are no longer transmitted or exchanged in the network.

This, however, creates a limitation in that once one user has decided that a particular content is a spam based on the sender, that content is blocked by the CIM for all other users and subsequent use. But what may be considered a spam to one user may not necessarily be considered a spam to another user. Thus allowing one user to decide that a content is a spam for all other users and for all future use is too restrictive, and limits exchange of actually desired contents for some users unnecessarily and without their knowledge.

DISCLOSURE OF INVENTION

Technical Solution

A technical goal of the present invention is to provide a terminal, server and method for more appropriately identifying and processing contents as spams, which address the limitations and disadvantages associated with the related art.

Another technical goal of the present invention is to provide a terminal, server and method for determining whether a content is (or should be treated as) a spam based on content ID information and spam information.

Another technical goal of the present invention is to provide a terminal, server and method for overriding an indication that a content is a spam based on overriding information.

Another technical goal of the present invention is to provide a terminal, server and method for selectively identifying content IDs that are associated with spams, and selectively blocking contents based on the identified content IDs.

According to an aspect of the present invention, there is provided a method for controlling a content by using a terminal, comprising: receiving a first content and a first content ID associated with the first content; transmitting the first content ID and spam information related to the first content ID to a content managing server, the spam information includes information indicating that the first content is to be considered as a spam; receiving the first content ID and indication information indicating that the first content is a spam from the content managing server; receiving a second content and a second content ID associated with the second content; comparing the second content ID, with the first content ID and the indication information; and processing the second content based on the comparison result.

According to another aspect of the present invention, there is provided a terminal for controlling a content in a network including a content managing server, the terminal comprising: a transceiver configured to transmit and receive signals to and from the content managing server; a controller configured to control the transceiver and at least one storage unit; and the at least one storage unit, wherein when the controller receives a first content and a first content ID associated with the first content, the controller generates spam information related to the first content ID, and transmits the first content ID and generated spam information to the content managing server, the spam information including information indicating that the first content is to be considered as a spam, wherein the controller receives the first content ID and indication information indicating that the first content is finally determined to be a spam from the content managing server in response to transmitting the first content ID and the spam information to the content managing server, the first content ID and the indication information being stored in the storage unit, and wherein when the controller receives a second content and a second content ID associated with the second content, the controller compares the second content ID, with the first content ID and the indication information, and processes the second content based on the comparison result.

According to another aspect of the present invention, there is provided a method for controlling a content by using a content managing server, comprising: receiving a content ID and spam information for a content from one or more terminals at one or more times, the spam information includes information indicating whether or not the content is to be considered as a spam; determining whether or not the content is a spam based on criteria, the criteria including the spam information; and notifying the one or more terminals that the content is a spam based on the determination result.

ADVANTAGEOUS EFFECTS

The present invention allows a content identity manager to make a final judgment on whether or not a particular content associated with a content ID is a spam by considering the spam information and other information as needed. Further, spams are identified based on the content IDs and not based on the senders. Thus, the contents can be more accurately determined and processed as spams. Moreover, not one terminal may dictate that a particular content is a spam. In addition, the content identity manager can override the spam information to cover situations where it is not desirable to process a particular content as a spam, regardless of the spam information.

BRIEF DESCRIPTION OF DRAWINGS

FIG. 1 is a block diagram of a system for determining and processing contents as spams according to an embodiment of the present invention.

FIG. 2 is a flowchart illustrating a method for determining and processing contents as spams according to an embodiment of the present invention.

FIG. 3 is a flowchart illustrating a method for determining and processing contents as spams according to another embodiment of the present invention.

FIG. 4 is a flowchart illustrating a method for determining and processing contents as spams according to another embodiment of the present invention.

FIG. 5 is an example of a table of content data, which may be stored in a database associated with a content identity manager according to an embodiment of the present invention.

MODE FOR THE INVENTION

Hereinafter, preferred embodiments of the present invention will be described in detail with reference to the accompanying drawings. The following embodiments should be considered in descriptive sense only and not for purpose of limitation.

A 'content' according to embodiments of the present invention can be any data, information, or signal in any form or type, and can be, for example, messages, requests, files, images, e-mails, texts, video and/or audio data, applications, SMS, MMS, picture, etc. or any combination of these or other items.

According to embodiments, spam information is any information related to a spam aspect of a content and/or any information which can be relied on by a CIM (or terminal) to determine if the content is a spam. The spam information preferably includes information (e.g., spam values) indicating if a content is (or should be treated as) a spam. The spam information can further include content related information. The content related information is any information related to the content, and can include, e.g., content ID, information about the type of content (e.g., file type, size, etc.), information about the content from another party (e.g., spam expert center), information on the bandwidth use of content, information on the number of times the content was sent to others or received by the current terminal, etc.

FIG. 1 is a block diagram of a system for determining and processing contents as spams according to an embodiment of the present invention.

Referring to FIG. 1, the system includes one or more terminals 10 (terminals A, B, C, D, E, . . . ), one or more severs (or other network entities) a, b, . . . , and one or more content identity managers (CIM) 20 configured to communicate with the terminals 10 and/or servers a, b, . . . through a network 40. The network 40 can be any network, e.g., mobile communication network, Internet, intranet, extranet, etc. All the components of the system are operatively coupled and configured.

Each terminal 10 can include a controller or processor 11, a display unit 12 (e.g., LCD panel) for displaying contents and other information, a transceiver 13 for transmitting and receiving various signals, one or more storage units 14 for storing data and other information, an input unit 15 (e.g., keypad, etc.), and a content authenticator 16 for authenticating contents using known authentication techniques.

The content authenticator 16 may also be configured to calculate a content ID of a content, if applicable, e.g., based on preset algorithms and parameters. For instance, the content authenticator 16 may select a stored content ID calculation function (e.g., type of hash or other mathematical algorithm) depending on the type of the content or other information. As a variation, the CIM 20 may transmit a particular content ID calculation function, which is then used by the content authenticator 16 to calculate the content ID for a particular content.

The storage unit(s) 14 can store therein content IDs and related spam information for various contents. The content IDs can be received from the CIM 20 or can be determined by the content authenticator 16. The store unit(s) 14 may also store the contents themselves. The spam information stored in the storage unit(s) 14 can indicate whether or not a content corresponding to each content ID is a spam (here, this indication can be the final spam judgment made by the CIM if available, or can be the initial judgment made by the terminal or user), and can include spam values used for such indications. As a variation, both indications (final spam judgment and initial terminal judgment) may be stored in the storage unit(s). Only certain content related information may be stored as part of the spam information stored in the storage unit(s).

The spam values can be represented in any manner, e.g., using flags. For example, for each content ID, a spam flag can indicate whether or not the corresponding content is a spam (e.g., spam flag=0 (no spam), or 1 (spam)). For a new content ID or at default, the spam flag can indicate 'no spam'. A network entity (e.g., CIM) can set or modify what kinds of values or parameters are used for the spam values and other spam information, and the terminals use such values or parameters accordingly.

The storage unit(s) 14 can be an internal memory of the terminal and/or one or more removable storage units such as a smart card (e.g., SIM (Subscriber Identification Module), USIM, UICC, R-UIM, CSIM, etc.), a memory card (e.g., SD (Secure Digital), MMC (MultiMediaCard), etc.), etc. That is, content IDs and spam information can be stored in the internal memory and/or removable storage unit(s), and thus can be modified by the CIM as needed. The content ID and spam information stored in the storage unit(s) can be modified by the CIM, e.g., by updating the removable storage unit (e.g., SIM card) using a well Over-The-Air (OTA) communication operation.

Once the CIM finally judges whether or not the content is a spam, the final judgment result can also be stored in the storage unit(s), e.g., in the internal memory through the transceiver 13 or in the SIM card through the OTA operation. This result can be stored in association with the content ID. For example, for each content ID, it would indicate that the corresponding content is finally judged to be a spam or not.

Each terminal 10 can also include other known components such as a camera module, an audio output unit, touch screen, etc. Each terminal 10 is also configured to communicate with other terminals or network entities such as servers via the network 40.

Each terminal 10 can be any device configured to communicate with the CIM 20. For example, the terminal 10 can be, but is not limited to, a mobile terminal, a mobile phone, a smart phone device, a computer notebook, a handset, a user equipment, a mobile station, a pager, an MP3 player, a portable recording/reproducing device, a PDA, a GPS device, a Bluetooth device, etc.

In the example of FIG. 1, the terminals A, B, C, . . . are configured to communicate with each other, with the servers a, b, . . . , and with the CIM 20, e.g., through one or more networks 40. The terminals A, B, C, . . . can be the same devices having the same or different components, or can be different devices having the same or different components. Regardless, each of these terminals is able to carry out the methods and operations of the present invention.

The CIM 20 includes a controller and other components (e.g., content ID calculator) for implementing the methods of the invention. Further, the CIM 20 may include a database/storage unit 30 for storing contents, content IDs, spam related information, etc. therein, or a separate database/storage unit 30 may be provided which is accessible by the CIM 20. The CIM 20 can be a server or entity/module for managing content IDs associated with contents (e.g., contents communicated among mobile terminals and other network entities), spam information (e.g., spam values) related to the content IDs, values obtained from analyzing the spam information (e.g., % values, etc.), receipt information (e.g., for indicating the number of times the same content is received by a terminal), overriding information indicating if the content is to be treated as a spam or no spam regardless of other information being considered, etc. The CIM 20 communicates with the storage unit 30 and the terminals 10 to ensure that each content is properly identified and/or stored in the storage unit 30. The CIM 20 can also communicate with other CIMs and other network entities if needed.

The storage unit 30 preferably stores therein all contents involved, content IDs for those contents, and spam information related to the content IDs. The storage unit 30 can further include additional information such as overriding information (e.g., advertisement information), receipt information (e.g., the number of times that the same content/content ID is received by a single terminal), spam % information (which may indicate, e.g., the number of times that the content is considered a spam by the terminal(s) over the total number of times the same content is sent/received by the terminal(s)/CIM), etc. The storage unit 30 can also store content related information and status information. The content related information is information related to the content, e.g., format of content, type of content, size of content, etc. Some of the content related information can be stored as part of the spam information. The status information may indicate a current status of the content. For example, if the content is a copy protected content, then the status information may indicate this. The status information can come from the terminal or a server, where the server can be the CIM or another server. In fact, the storage unit 30 can be configured to store any information associated with the contents, as desired, and any information used by the CIM 20.

Various methods discussed herein including the methods of FIGS. 2-4 are implemented in the system of FIG. 1, but can be implemented in other suitable systems. Further, in FIGS. 2-4, although the terminals A, B, C, D and K are shown and discussed, these devices may be replaced by servers such that the operations performed by these terminals may be performed by the servers, which are covered by the invention.

FIG. 2 is a flowchart illustrating a method for determining and processing contents as spams according to an embodiment of the present invention.

Referring to FIG. 2, at step S2, a terminal (e.g., terminal K) sends a content ID of a particular content to a plurality of other terminals. At this time, the content itself may also be sent with the content ID from the terminal K to the plurality of terminals. For example, the terminal K sends a content 1 and the corresponding content ID (ID1) to each of the terminals A, B, C and D, e.g., through the network 40. The terminal K can know the content ID of the content 1 by generating the content ID using the content authenticator 16 of the terminal K, or by receiving the content ID from the CIM 20 (e.g., the terminal K can request it from the CIM 20). If the terminals A, B, C and D already store therein the content 1, then it may not be necessary for the terminal K to transmit the content 1 again to these terminals.

At step S4, each of the terminals A, B, C and D receives the content ID1 (or content and content ID1) from the terminal K, and transmits spam information related to the content ID1 to the CIM 20. For instance, as the spam information, each of the terminals A-D generates a specific spam value for the content ID1, and transmits the content ID and the generated spam value (and maybe with the content if needed) to the CIM 20. The spam vale indicates whether or not the content corresponding to the content ID1 is a spam. Each terminal or user at the terminal can decide if the content is a spam, and each terminal (e.g., controller 11 or authenticator 16) generates a specific value that indicates this decision.

For example, each of the terminals A, B and C may decide that the content 1 is a spam and transmit the spam value of '1' (spam) to the CIM 20, whereas the terminal D may decide that the same content 1 is not a spam and transmit the spam value of '0' (no spam) to the CIM 20 for the content 1.

As mentioned, if the CIM 20 already has the content 1 stored in the database 30, then in step S4, the content 1 may not be transmitted from the terminals A-D to the CIM 20. Also, in step S4, in addition to the spam value, each of the terminals A-D may transmit other information, e.g., content related information (e.g., type of content, size of content, etc.) for the content ID1, as part of the spam information.

At step S6, the CIM 20 determines whether or not the content 1 corresponding to the content ID1 is a spam based on the spam information received from the terminals A-D. As discussed above, the spam information can include the spam values and the content related information associated with the content 1. The CIM 20 examines the spam information for the content ID1 from each of the terminals A-D (and maybe from other terminals), and judges whether the content 1 is a spam.

At step S6, in one example, to decide if the content is a spam, the CIM 20 can calculate how many terminals consider the content as a spam among all terminals that receive the content in view of the spam information, and compare this calculated percentage number with preset information. In another example, the CIM 20 can calculate a spam percentage T as follows:

$$T\% = (\text{number of times content is a spam})/(\text{total number of times content is sent/received by terminal(s)/CIM})$$

Other ways of evaluating the spam information are also possible. If the calculated percentage number is higher than a value preset by the CIM (or the operator, third party, etc.), then the CIM 20 may judge that the content is a spam. However, if the calculated percentage number is less than or equal to the preset value, then the CIM 20 may judge that the content is not a spam. In another example at step S6, to decide if the content is a spam the CIM 20 can add the received spam values, determine a percentage value using the added value and the highest possible added value, and compare this percentage value with preset information. Any values calculated using the spam information (e.g., the percentage numbers discussed above) can also be stored in the database 30.

In a variation, when evaluating the spam values in step S6 to judge if the content is a spam, the CIM 20 can weigh each spam value of the same content from the different terminals/users, differently. For instance, if particular users or terminals are known to generate many spams, then the CIM 20 may weigh (or not count) the spam values from those terminals be less than the spam values from other terminals.

At step S6, in addition to the spam values received from the terminals A-D, the CIM 20 may also consider other spam information or any other information to judge if the content is a spam. Such other information may include content related information, which is stored in the database 30 and/or received from the terminals A-D. For example, as part of the spam information or other information, the content related information for the content 1 indicates that the content 1 is of a certain file size, type and format, then the CIM may determine that the content is likely a spam and consider this determination with the spam values to make the final judgment on whether or not the content 1 is a spam. For instance, if the content related information indicates that the content 1 is likely a spam, but the spam values from all terminals indicate otherwise, then the CIM may weigh the spam values more and judge that the content 1 is not a spam. In another example, if the content related information indicates that the content 1 is not likely a spam, but the spam values from the terminals indicate that the content 1 is a spam, the CIM 20 may weigh the content related information more and judge that the content 1 is not a spam. In still another example, if a terminal involved is a 2 G mobile phone and the content is a video (i.e., device type and content type are considered), then the CIM 20 may treat the content as a spam (even if the spam values indicate otherwise) since the 2 G mobile phone generally cannot display video and thus the video content is like a spam (useless).

Criteria for the CIM to make the final judgment on whether or not the content is a spam can vary and set differently depending on the system, network, CIM, application, etc. Further, different algorithms or evaluation methods may be used depending on the device type, application, content type, etc. in making the final judgment.

The result of the final judgment indicating whether or not the content is a spam (determined by the CIM) is stored in the database 30 in association with the corresponding content ID. For each content ID, the CIM 20 can indicate the corresponding content is a spam or not in the database 30.

At step S8, once the CIM 20 makes the final judgment on whether or not the content is a spam, the CIM notifies the network about this judgment. For example, the CIM 20 may notify the network entities including the terminals A-D and K and any other applicable terminals and servers that this content is a spam. In this regard, the CIM 20 may send the content ID and a flag indicating that the content of the identified content ID is a spam (or not a spam). As a variation, using the OTA operation, the CIM 20 can update the storage unit(s) 14 like the SIM card in the terminal(S) so that the content of the identified content ID is indicated to be a spam (or not a spam) in the storage unit(s) 14. The final indication from the CIM that the content is a spam (or no spam) can be stored as part of the spam information in the storage unit(s) 14 in association with the corresponding content ID.

At step S10, if the content has been indicated as a spam by the CIM, then that content is processed as a spam according to known operations. For instance, use of that content can be blocked in the network. In non-limiting examples, each terminal may not transmit to others the content indicated as a spam. The network such as a server may block the transmission of the spam content within the network. The content may be deleted or put into a trash box by the terminals and servers for preventing future use. Other operations are possible.

On the other hand at step S10, if the content has been indicated as a 'no spam' by the CIM, then the content is processed as a 'no spam'. For instance, when the terminal C receives another content (or content ID), then the terminal C (e.g., the controller 11) can check the storage unit(s) 14 to see if there exists a content ID that matches the newly received content ID. If there is a match, then it checks out the latest or final spam information for that content ID, and thereby determines whether or not the content is a spam and processes the content accordingly. If there is no match, then the terminal may store the newly received content ID and a default spam value (e.g., 'no spam') in association with the newly received content ID in the storage unit 14. Accordingly, the CIM makes a final judgment on whether or not a particular content associated with a content ID is a spam by considering the spam information and possibly other information. Thus, the content can be more accurately determined and processed as a spam, and a single terminal may not alone dictate how the content is processed as a spam or a no spam for all other terminals.

FIG. 3 is a flowchart illustrating a method for determining and processing contents as spams according to another embodiment of the present invention.

Referring to FIG. 3, at step S1, a terminal receives a content and the corresponding content ID, multiple times, from a plurality of different terminals. That is, the same content ID (with or without the content) may be received many times by a single terminal. For example, a terminal A receives the same content 1 and the same content ID (ID1) of the content 1 from each of other terminals B, C and K. If the terminal A already has the content 1, then only the content ID (without the content itself) may be sent from the terminals B, C and K to the terminal. As a variation, the terminal A may receive the content 1 and may generate an appropriate content ID using the content authenticator 16 of the terminal A as discussed above.

At step S3, the terminal A transmits the content ID1, the corresponding spam information and receipt information to the CIM 20. Particularly, the terminal A can generate the spam information, e.g., a spam value for the content 1 (identified by the content ID1), as discussed above. For example, a user of the terminal A or the terminal A itself may decide that the content 1 is a spam. The spam information may also include the content related information. The receipt information can indicate, e.g., the number of times the same content (or same content ID) is received by the terminal A. In this example, the terminal A receives the content ID1 (or content 1) three times, and thus the receipt information may indicate 3.

At step S3, in addition to the content ID1, the spam information and the receipt information, the terminal A may also transmit the content 1 itself to the CIM 20. If the CIM 20 already has the content 1 stored in the database 30, however, then the transmission of the content 1 to the CIM 20 may not be needed.

At step S6, the CIM 20 determines whether or not the content 1 corresponding to the identified content ID1 is a spam based on the spam information and receipt information received from the terminal A. Step S6 of FIG. 3 can be identical to or similar to step S6 of FIG. 2, except that the receipt information may be additionally considered in making the final judgment on whether or not the content 1 is a spam. For example, the CIM may weigh in (or factor in) the receipt information when considering the spam value for the content ID. An algorithm may be performed on the receipt information and the spam information (e.g., spam value).

Only as a non-limiting example for explanation, the CIM may multiply the spam value received from the terminal A for the content ID1, with the receipt value of 3 (three times received by the terminal A), and compare the multiplied value with preset information to make a final judgment on whether or not the content 1 is a spam.

At step S8, once the CIM 20 makes the final judgment on whether or not the content 1 is a spam, the CIM 20 notifies the network about this judgment. At step S10, if the content 1 has been indicated as a spam, then the content 1 is processed as a spam according to known operations. Otherwise, the content 1 is processed as a no spam. Steps S8 and S10 of FIG. 3 are identical to or similar to steps S8 and S10 of FIG. 2, respectively.

FIG. 4 is a flowchart illustrating a method for determining and processing contents as spams according to another embodiment of the present invention.

Referring to FIG. 4, at step S1, a terminal A receives a content ID (ID1) (with or without the content 1), multiple times, from a plurality of different terminals B, C and K. Step S1 of FIG. 4 is identical to or similar to step S1 of FIG. 3.

At step S5, all or some of the terminals that are interested in the content 1 can transmit the content ID1 (with or without the content 1 itself as needed) and the corresponding spam information to the CIM 20. In this example, each of the terminals A, C and K generates and transmits the spam information related to the content ID1 to the CIM 20. As the spam information, each of the terminals A, C and K can generate its own specific spam value for the content ID1, and transmit the content 1, the content ID1 and the generated spam value to the CIM 20. As discussed, each terminal or terminal user may decide if the content is a spam, and each terminal (e.g., controller 11 or authenticator 16) can generate a specific spam value that indicates this decision. If a spam value for the content ID1 is already stored in the terminal, then the terminal may retrieve and transmit the stored spam value.

In an example, the terminals A and K may decide that the content 1 is a spam and transmit the spam value of '1' (spam) to the CIM 20, whereas the terminal C may decide that the same content 1 is not a spam and transmit the spam value of '0' (no spam) to the CIM 20 for the same content.

If the CIM 20 already has the content 1 stored in the database 30, then in step S5, the content 1 may not be transmitted from these terminals to the CIM 20. Also, in step S5, in addition to the spam value, each of the terminals A, C and K may transmit content related information for the content ID1 and/or other information, as part of the spam information.

Also, from the terminal A, in addition to the content ID and the spam information, the corresponding receipt information (discussed in step S3 of FIG. 3) may also be sent to the CIM 20.

Step S5 can be identical to or similar to step S4 of FIG. 2, but the different terminal numbers are involved.

At step S7, the CIM 20 determines whether or not the content 1 corresponding to the identified content ID1 is (or should be treated as) a spam based on certain criteria. The criteria can include at least one of the received spam information from each of the terminal A, C and K, the receipt information received from the terminal A, values (e.g., the number of times the content is considered a spam by terminal(s) over the total number of times the content is received by the terminal(S), etc.) calculated using the spam information, and overriding information. The criteria may further include other information or data.

In an embodiment, the overriding information is information stored at the network side (e.g., in the database 30) which can override the spam information and/or other information that the CIM 20 considers to make the final judgment on whether or not the content is a spam.

Preferably, step S7 is similar to step S6 of FIG. 2 or 3, but the overriding information may be additionally considered by the CIM 20 in making the final judgment on whether or not the content 1 is a spam. That is, in certain cases, it may desirable for the CIM to process a content as never a spam, and the network operator, system administrator, etc. may make this decision and set up the CIM as needed. This can be used, e.g., when an advertiser pays to advertise a certain content from a service provider or other party. In that case, the CIM needs to be set up so that such advertisement content is never treated as a spam so that it can be advertised to all users. Further, there may be multiple values present in the overriding information, where one of such values can be selected and used by the CIM depending on situations or need.

As a non-limiting example of the overriding information, advertisement indicating whether or not the content is an advertisement, is stored in the database 30 in association with the corresponding content ID. In such case, even if the spam information (e.g., spam values) and/or value(s) calculated using the spam information (e.g., the calculated % value—see step S6)) indicate that the content is a spam, if the advertisement information indicates that the content is an advertisement, then this indication overrides the initial indication that the content is a spam, and the CIM 20 finally judges that the content is not a spam.

At step S12, the CIM 20 notifies the terminals, servers, other CIMs, or other network entities as needed, that the content corresponding to the particular content ID is a spam (or not a spam). If the spam information and content IDs are to be stored in the (removable) storage unit(s) 14 of the terminal(s), this notification can be made by using the OTA operation, e.g., by updating the spam information. Obviously, any known communication methods may be used to provide such notification.

At step S14, if in step S12 that the content 1 (identified by the content ID1) is finally determined to be a spam, then the content is processed accordingly. For example, the content (or the corresponding content ID1) may be transmitted among the terminals since this content is not a spam. If the final judgment indicates that the content is a spam, then the content may be blocked as discussed in step S10 of FIG. 3.

FIG. 5 is a non-limiting example of a table of content data, which may be stored in the database 30 according to an embodiment of the present invention.

As shown in FIG. 5, in the database 30, for each content, a content ID 52, content type information 53, spam information 54, 55, 56, and advertisement (example of overriding information) information 50 may be stored. Different spam information may be provided for different devices, scenarios, situations, etc. In this example, the first spam information 54 may indicate spam information in case that the involved terminal (e.g., terminal that received the content) is a 2 G type mobile phone, the second spam information 55 may indicate spam information in case that the involved terminal is a 3 G type mobile phone, and the third spam information 56 may indicate spam information in case that the involved terminal is a PDA. The % in each spam information 54, 55, 56 may represent the number of times the content is indicated as a spam (e.g., based on the spam values) divided by the total number of times the same content is sent (e.g., to the CIM or within the network given a time period, etc.). The advertisement information 50 may indicate whether or not the content is an advertisement. "N" (no) or "Y" (yes) in each spam information 54, 55, 56 may represent the final judgment of the CIM on whether or not the content is a spam.

In the examples of FIG. 5, for instance, "20%–N" in the table indicates that the content identified by the content ID "2Zef5216" has been indicated as a spam by 20% of 2 G phone users, and is finally judged to be a spam ("N" in "20%–N") by the CIM. The content identified by the content ID "Ee4564er1" is finally judged to be a spam for all devices (2 G phones, 3 G phones and PDAs) by the CIM 29, in view of the high % numbers and the advertisement information 50 indicating the content is not an advertisement. The content having the content ID "Dazzf5911er" is finally judged to be a spam only for the 2 G phones since the 2 G phones may consider video contents as spams because they cannot display video. The content having the content ID of "Zfef23a" is an advertisement as indicated by the advertisement information 50 and cannot be a spam. Thus, regardless of the % numbers (and other factors), in view of the advertisement information 50 (overriding information), this content is finally judged to be 'no spam' for all devices. These are only examples given for explanation purposes, and should not limit the scope of the claims.

Accordingly, the present invention provide effective techniques of determining contents as spams and processing them based on the determination.

While the present invention has been particularly shown and described with reference to exemplary embodiments thereof, it will be understood by those skilled in the art that various changes in form and details may be made therein without departing from the spirit and scope of the present invention as defined by the appended claims.

INDUSTRIAL APPLICABILITY

The present invention may be applicable to a terminal and network entity that provide identifications of contents.

The invention claimed is:

1. A method for controlling a content by using a terminal, comprising:
   receiving, by the terminal, a first content and a first content ID associated with the first content, wherein the first content and the first content ID are received from one or more other terminals at multiple times;
   transmitting, by the terminal, the first content ID and spam information related to the first content ID to a content managing server, wherein the content managing server determines whether or not the first content is a spam based on criteria, and generates indication information based on the determination result,
   wherein the criteria include the spam information and overriding information indicating that the first content is not a spam despite other information being considered,
   wherein the criteria further include additional spam information indicating that the first content is to be considered as the spam from the one or more other terminals, and
   wherein the additional spam information for the first content from the one or more other terminals is weighted differently;
   receiving the first content ID and the indication information indicating that the first content is a spam from the content managing server;
   receiving a second content and a second content ID associated with the second content;
   comparing the second content ID, with the first content ID and the indication information; and
   processing the second content based on the comparison result.

2. The method of claim 1, further comprising: storing the first content ID and the indication information in a storage device.

3. The method of claim 2, wherein the storage device is an internal memory of the terminal, or a removable storage device associated with the terminal.

4. The method of claim 1, wherein the transmitting step transmits the first content ID, the spam information, and receipt information indicating the number of times the first content is received, to the content managing server.

5. The method of claim 1, wherein the spam information further includes content related information associated with the first content.

6. A terminal for controlling a content in a network including a content managing server, the terminal comprising:
   a transceiver configured to transmit and receive signals to and from the content managing server;
   a controller configured to control the transceiver and at least one storage unit; and
   the at least one storage unit, wherein when the controller receives a first content and a first content ID associated with the first content,
   wherein the first content and the first content ID are received from one or more other terminals at multiple times, and the controller generates spam information related to the first content ID, and transmits the first content ID and the generated spam information to the content managing server,
   wherein the content managing server determines whether or not the first content is a spam based on criteria, and generates indication information based on the determination result,
   wherein the criteria include the spam information and overriding information indicating that the first content is not a spam despite other information being considered,
   wherein the criteria further include additional spam information indicating that the first content is to be considered as the spam from the one or more other terminals, wherein the additional spam information for the first content from the one or more other terminals is weighed differently,
   wherein the controller receives the first content ID and the indication information indicating that the first content is finally determined to be a spam from the content managing server in response to transmitting the first content ID and the spam information to the content managing server, the first content ID and the indication information being stored in the storage unit, and
   wherein when the controller receives a second content and a second content ID associated with the second content, the controller compares the second content ID, with the first content ID and the indication information, and processes the second content based on the comparison result.

7. The terminal of claim 6, further comprising: a content authenticator configured to calculate the first content ID for the first content and to transmit the first content ID to the controller.

8. The terminal of claim 6, wherein the storage unit is an internal memory of the terminal, or a removable storage device associated with the terminal.

9. The terminal of claim 6, wherein the controller transmits the first content ID, the spam information, and receipt information indicating the number of times the first content is received, to the content managing server.

10. The terminal of claim 6, wherein the spam information further includes content related information associated with the first content.

11. The method of claim 1, wherein the criteria further include device type information and content type information.

12. The terminal of claim 6, wherein the criteria further include device type information and content type information.

* * * * *